3,326,933
3-ALKYL-5-PHENOXY-METHYLPYRAZOLES
John B. Wright, Kalamazoo Township, Kalamazoo County, Mich., assignor to The Upjohn Company, Kalamazoo, Mich., a corporation of Delaware
No Drawing. Filed Mar. 2, 1964, Ser. No. 348,866
2 Claims. (Cl. 260—310)

This invention pertains to novel pyrazole derivatives and to a novel process for the preparation thereof. More particularly the invention pertains to novel 3-alkyl-5-phenoxymethylpyrazoles of the formula:

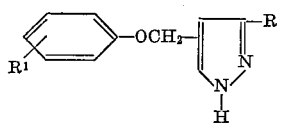

wherein R represents alkyl of one to four carbon atoms, inclusive, and $R^1$ represents from zero to three substituents selected from the group consisting of alkyl of one to four carbon atoms, inclusive, alkoxy of one to four carbon atoms, inclusive, and halogen.

Examples of alkyl of one to four carbon atoms, inclusive, are methyl, ethyl, propyl, butyl, and isomeric forms thereof. Examples of alkoxy of one to four carbon atoms, inclusive, are methoxy, ethoxy, propoxy, butoxy, and isomeric forms thereof. Examples of halogen are fluorine, chlorine, bromine, and iodine.

The novel 3-alkyl-5-phenoxymethylpyrazoles of the invention are prepared by reacting hydrazine with a 1-phenoxy-2,4-alkanedione of Formula II below, in accordance with the equation:

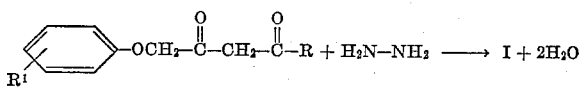

wherein R and $R^1$ are as defined above.

Advantageously, the reaction is carried out by mixing the reactants in the presence of an inert liquid medium, e.g., water or an inert organic solvent such as methanol, ethanol, tetrahydrofuran, dioxane, and the like. Such organic solvent, when used, need not be anhydrous, for in any event the reaction mixture will become aqueous because water is formed in the reaction. Anhydrous hydrazine can be employed, but ordinarily it is more convenient to employ hydrazine hydrate or a hydrazine salt, e.g., sulfate or hydrochloride. When a hydrazine salt is employed, sufficient base (e.g., sodium or potassium hydroxide) is added to the reaction mixture to liberate free hydrazine. Preferably, the diketone of Formula II and the hydrazine are employed in substantially equimolar amounts, although if desired an excess of either reactant can be used, e.g., up to about 50% excess of either reactant. The reaction can be carried out at temperatures ranging between about 0° C. and about 50° C., or even somewhat lower or higher; preferably, the reaction is carried out between about 5° C. and about 35° C. The time required for completing the reaction will vary depending on specific circumstances such as the particular Formula II diketone employed, the concentration of reactants, the reaction temperature, etc. In general, the reaction is complete within about 0.5 to about 12 hours. The desired 3-alkyl-5-phenoxymethylpyrazole of Formula I can be isolated and purified by conventional techniques, e.g., by filtering the reaction mixture followed by washing and recrystallizing the filter cake.

The starting materials, 1-phenoxy-2,4-alkanediones of Formula II, can be prepared by reacting an alkyl phenoxyacetate of the formula:

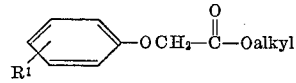

wherein $R^1$ is as defined above and "alkyl" preferably is methyl or ethyl but can also be isopropyl, butyl, pentyl, and the like, with a 2-alkanone (i.e., a methyl alkyl ketone) of the formula:

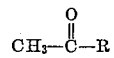

wherein R is as defined above. Examples of Formula IV 2-alkanones are acetone, 2-butanone (methyl ethyl ketone), 2-pentanone (methyl propyl ketone), 3-methyl-2-butanone (methyl isopropyl ketone), 2-hexanone (methyl butyl ketone), 4-methyl-2-pentanone (methyl isobutyl ketone), 3-methyl-2-pentanone (methyl sec.butyl ketone), and the like.

The reaction between the compounds of Formulae III and IV can be carried out in accordance with known procedures, for example, under anhydrous conditions in the presence of an alkaline condensing agent such as powdered sodium, sodium amide, or sodium hydride. See Fusco et al., Gazz. Chim. Ital. 71, 406, 1941, and Henecka, Chem. Ber. 82, 32, 1949.

The alkyl phenoxyacetates of Formula III can be prepared by esterifying a phenoxyacetic acid of the formula:

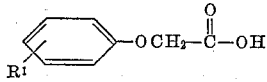

wherein $R^1$ is as defined above, with an alkanol such as methanol, ethanol, butanol, and the like. The phenoxyacetic acids, many of which are known, are prepared by known methods, for example, by reacting chloroacetic acid with a sodium phenoxide.

The compounds of the present invention are orally active antidiabetic agents useful for lowering blood sugar content in mammals to a safe level.

For such oral administration, the active compounds can be administered in liquid or solid dosage forms. Solid forms include capsules, tablets, powder, pills, and the like, and liquid forms include suitably flavored aqueous suspensions and solutions (depending on concentration desired), and flavored oil suspensions and solutions wherein edible oils, e.g., cottonseed oil, coconut oil, peanut oil, sesame oil, or mixtures of these, and the like, can be employed.

For preparing compositions such as tablets and other compressed formulations, the composition can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft capsules utilizing conventional pharmaceutical practices.

The following examples are illustrative of the process and products of the present invention but are not to be construed as limiting.

*Example 1.—3-methyl-5-phenoxymethylpyrazole*

A. *1-phenoxy-2,4-pentanedione.*—To a mixture of 300 ml. of anhydrous diethyl ether and 38.2 g. (0.98 mole) of sodium amide was added a solution of 88.0 g. (0.49 mole) of ethyl phenoxyacetate and 32.5 g. (0.56 mole) of acetone. The mixture was stirred for four hours at about 25° C. and then was poured slowly into about 200 ml. of ice-water. The acqueous layer, after extraction with diethyl ether, was acidified with dilute sulfuric acid and then made slightly basic with sodium bicarbonate, and the resulting mixture was extracted with diethyl ether in several portions. The combined ether extract was dried with anhydrous magnesium sulfate, filtered, and concentrated to dryness. The residue was distilled under reduced pressure to obtain 55.0 g. of 1-phenoxy-2,4-pentanedione as a yellow oil; B.P. 155–160° C./14 mm. Hg; $n_D^{23}$ 1.5440.

B. *3-methyl - 5 - phenoxymethylpyrazole.*—Hydrazine sulfate (13.0 g.; 0.1 mole) was mixed with 75 ml. of 10% aqueous sodium hydroxide solution. To the resulting solution was added, with stirring, 19.2 g. (0.1 mole) of 1-phenoxy-2,4-pentanedione while maintaining the mixture between 5° and 10° C. The mixture after being stirred for two hours within the same temperature range was diluted with about 200 ml. of water and filtered, and the filter cake was washed with water. The washed filter cake was recrystallized from cyclohexane. There was thus obtained 15.2 g. (81% yield) of 3-metyhl-5-phenoxymethylpyrazole in the form of colorless prisms having a melting point of 86.5–89° C. An analytical sample obtained by a second recrystallization from cyclohexane had a melting point of 88–89.5° C.

*Analysis.*—Calcd. $C_{11}H_{12}N_2O$: C, 70.18; H, 6.43; N, 14.88. Found: C, 70.14; H, 6.37; N, 14.57.

*Example 2.—3-ethyl-5-phenoxymethylpyrazole*

A. *1-phenoxy-2,4-hexanedione.*—Following the procedure of Example 1, Part A, but replacing acetone with methyl ethyl ketone, there was obtained 1-phenoxy-2,4-hexanedione.

B. *3-ethyl - 5 - phenoxymethylpyrazole.*—Following the procedure of Example 1, Part B, but replacing 1-phenoxy-2,4-pentanedione with 1-phenoxy-2,4-hexanedione, there was obtained 3-ethyl-5-phenoxymethylpyrazole.

*Example 3.—3-propyl-5-phenoxymethylpyrazole*

A. *1-phenoxy-2,4-heptanedione.*—Following the procedure of Example 1, Part A, but replacing acetone with methyl propyl ketone, there was obtained 1-phenoxy-2,4-heptanedione.

B. *3.-propyl - 5 - phenoxymethylpyrazole.*—Following the procedure of Example 1, Part B, but replacing 1-phenoxy-2,4-pentanedione with 1-phenoxy - 2,4 - heptanedione, there was obtained 3-propyl-5-phenoxymethylpyrazole.

*Example 4.—3-sec.butyl-5-phenoxymethylprazole*

A. *1-phenoxy-5-methyl-2,4 - heptanedione.*—Following the procedure of Example 1, Part A, but replacing acetone with methyl sec.butyl ketone, there was obtained 1-phenoxy-5-methyl-2,4-heptanedione.

B. *3-sec.butyl - 5 - phenoxymethylpyrazole.*—Following the procedure of Example 1, Part B, but replacing 1-phenoxy-2,4-pentanedione with 1-phenoxy-5-methyl - 2,4 - heptanedione, there was obtained 3-sec.butyl-5-phenoxymethylpyrazole.

*Example 5.—3-methyl-5-(2-methylphenoxy) methylpyrazole*

A. *1-(2-mehyldroxyphenoxy)-2,4 - hexamedione.*—Foling the procedure of Example 1, Part A, but replacing ethyl phenoxyacetate with methyl (2-methylphenoxy) acetate, there was obtained 1-(2-methylphenoxy)-2,4-pentanedione.

B. *3-ethyl-5 - (2 - methoxyphenoxymethyl)pyrazole.*—Following the procedure of Example 1, Part B, but replacing 1-phenoxy-2,4-pentanedione with 1 - (2 - methylphenoxy)-2,4-pentanedione, there was obtained 3-methyl-5-(2-methylphenoxymethyl)pyrazole.

*Example 6.—3-ethyl-5-(2-methoxyphenoxymethyl) pyrazole*

A. *1 - (2 - methoxyphenoxy) - 2,4 - hexanedione.*—Following the procedure of Example 2, Part A, but replacing ethyl phenoxyacetate with butyl (2-methoxyphenoxy) acetate, there was obtained 1-(2-methoxyphenoxy)-2,4-hexanedione.

B. *3-ethyl-5-(2 - methoxyphenoxymethyl)pyrazole.*—Following the procedure of Example 2, Part B, but replacing 1-phenoxy-2,4-hexanedione with 1-(2-methoxyphenoxy)-2,4-hexanedione, there was obtained 3-ethyl-5-(2-methoxyphenoxymethyl)pyrazole.

*Example 7.—3-isopropyl-5-(2-chlorophenoxymethyl) pyrazole*

A. *1-(2 - chlorophenoxy)-5-methyl-2,4-hexanedione.*—Following the procedure of Example 1, Part A, but replacing ethyl phenoxyacetate and acetone with ethyl (2-chlorophenoxy)acetate and methyl isopropyl ketone, respectively, there was obtained 1-(2 - chlorophenoxy)-5-methyl-2,4-hexanedione.

B. *3-isopropyl-5-(2 - chlorophenoxymethyl)pyrazole.*—Following the procedure of Example 1, Part B, but replacing 1-phenoxy - 2,4 - pentanedione with 1-(2-chlorophenoxy)-5-methyl-2,4-hexanedione, there was obtained 3-isopropyl-5-(2-chlorophenoxymethyl)pyrazole.

*Example 8.—3-butyl-5-(6-ethoxy-3-methylphenoxymethyl)pyrazole*

A. *1-(6 - ethoxy-3-methylphenoxy)-2,4-octanedione.*—Following the procedure of Example 1, Part A, but replacing ethyl phenoxyacetate and acetone with ethyl (6-ethoxy-3-methylphenoxy)acetate and methyl butyl ketone, respectively, there was obtained 1-(6-ethoxy-3-methylphenoxy)-2,4-octanedione.

B. *3 - butyl - 5 - (6-ethoxy-3-methylphenoxymethyl) pyrazole.*—Following the procedure of Example 1, Part B, but replacing 1-phenoxy-2,4-pentanedione with 1-(6-ethoxy-3-methylphenoxy)-2,4-octanedione, there was obtained 3 - butyl - 5 - (6-ethoxy-3-methylphenoxymethyl) pyrazole.

Following the procedure of Example 1, Part A, but replacing ethyl phenoxyacetate with the ethyl esters of (3-methylphenoxy)acetic acid,
(4-methylphenoxy)acetic acid,
(2,4-dimethylphenoxy)acetic acid,
(3,4-dimethylphenoxy)acetic acid,
(2,5-dimethylphenoxy)acetic acid,
(2,4,5-trimethylphenoxy)acetic acid,
(3,4,5-trimethylphenoxy)acetic acid,
(2-ethylphenoxy)acetic acid,
(3-ethylphenoxy)acetic acid,
(4-ethylphenoxy)acetic acid,
(2-isopropylphenoxy)acetic acid,
(4-isopropylphenoxy)acetic acid,
(2-propylphenoxy)acetic acid,
(3-propylphenoxy)acetic acid,
(4-propylphenoxy)acetic acid,
(2-butylphenoxy)acetic acid,
(4-butylphenoxy)acetic acid,
(2-sec.butylphenoxy)acetic acid,
(3-tert.butylphenoxy)acetic acid,
(4-tert.butylphenoxy)acetic acid,
(2,4-di-tert.butylphenoxy)acetic acid,
(6-butyl-2-methylphenoxy)acetic acid,
(5-isopropyl-2-methylphenoxy)acetic acid,
(3-methoxyphenoxy)acetic acid,
(4-methoxyphenoxy)acetic acid,
(2,4-dimethoxyphenoxy)acetic acid,
(2,5-dimethoxyphenoxy)acetic acid,
(2-ethoxyphenoxy)acetic acid,
(3-ethoxyphenoxy)acetic acid,
(4-ethoxyphenoxy)acetic acid,
(2-propoxyphenoxy)acetic acid,
(4-propoxyphenoxy)acetic acid,
(2-butoxyphenoxy)acetic acid,
(4-butoxyphenoxy)acetic acid,
(3,4,5-trimethoxyphenoxy)acetic acid,
(3-chlorophenoxy)acetic acid, (4-chlorophenoxy)acetic acid,
(2,4-dichlorophenoxy)acetic acid,
(2,5-dichlorophenoxy)acetic acid,
(2,6-dichlorophenoxy)acetic acid,
(3,4-dichlorophenoxy)acetic acid,
(2,4,5-trichlorophenoxy)acetic acid,
(2,4,6-trichlorophenoxy)acetic acid,
(2-bromo-3-chlorophenoxy)acetic acid,
(4-bromo-2-chlorophenoxy)acetic acid,
(5-bromo-2,4-dichlorophenoxy)acetic acid,
(4-bromo-2-fluorophenoxy)acetic acid,
(2-bromophenoxy)acetic acid,
(3-bromophenoxy)acetic acid,
(4-bromophenoxy)acetic acid,
(2,4-dibromophenoxy)acetic acid,
(2,6-dibromophenoxy)acetic acid,
(3,5-dibromophenoxy)acetic acid,
(2-fluorophenoxy)acetic acid,
(3-fluorophenoxy)acetic acid,
(4-fluorophenoxy)acetic acid,
(2,4-difluorophenoxy)acetic acid,
(2,5-difluorophenoxy)acetic acid,
(2-fluoro-4-iodophenoxy)acetic acid,
(2-iodophenoxy)acetic acid,
(3-iodophenoxy)acetic acid,
(4-iodophenoxy)acetic acid,
(2,4,5-trifluorophenoxy)acetic acid,
(2,4-dichloro-6-fluorophenoxy)acetic acid,
(2-bromo-4-butoxyphenoxy)acetic acid,
(2-bromo-4-butylphenoxy)acetic acid,
(2-bromo-4-tert.butylphenoxy)acetic acid,
(2-bromo-4-ethylphenoxy)acetic acid,
(4-bromo-2-methoxyphenoxy)acetic acid,
(2,6-dimethoxy-4-methylphenoxy)acetic acid,
(2-fluoro-3-methylphenoxy)acetic acid,
(4-fluoro-2-isopropyl-5-methylphenoxy)acetic acid,
(3,5-dichloro-2-methoxyphenoxy)acetic acid,
(2-bromo-4-propoxyphenoxy)acetic acid,
(2-sec.butyl-4-chlorophenoxy)acetic acid,
(4-butyl-2-chlorophenoxy)acetic acid,
(2-butyl-4-fluorophenoxy)acetic acid,
(2-chloro-4-methoxyphenoxy)acetic acid, and
(4-chloro-2-methoxyphenoxy)acetic acid, there are obtained the corresponding 1-(substituted-phenoxy)-2,4-pentanediones, which are then converted by the procedure of Example 1, Part B, to 3-methyl-5-(3-methylphenoxymethyl)pyrazole,
3-methyl-5-(4-methylphenoxymethyl)pyrazole,
3-methyl-5-(2,4-dimethylphenoxymethyl)pyrazole,
3-methyl-5-(3,4-dimethylphenoxymethyl)pyrazole,
3-methyl-5-(2,5-dimethylphenoxymethyl)pyrazole,
3-methyl-5-(2,4,5-trimethylphenoxymethyl)pyrazole,
3-methyl-5-(3,4,5-trimethylphenoxymethyl)pyrazole,
3-methyl-5-(2-ethylphenoxymethyl)pyrazole,
3-methyl-5-(3-ethylphenoxymethyl)pyrazole,
3-methyl-5-(4-ethylphenoxymethyl)pyrazole,
3-methyl-5-(2-isopropylphenoxymethyl)pyrazole,
3-methyl-5-(4-isopropylphenoxymethyl)pyrazole,
3-methyl-5-(2-propylphenoxymethyl)pyrazole,
3-methyl-5-(3-propylphenoxymethyl)pyrazole,
3-methyl-5-(4-propylphenoxymethyl)pyrazole,
3-methyl-5-(2-butylphenoxymethyl)pyrazole,
3-methyl-5-(4-butylphenoxymethyl)pyrazole,
3-methyl-5-(2-sec.butylphenoxymethyl)pyrazole,
3-methyl-5-(3-tert.butylphenoxymethyl)pyrazole,
3-methyl-5-(4-tert.butylphenoxymethyl)pyrazole,
3-methyl-5-(2,4-di-tert.butylphenoxymethyl)pyrazole,
3-methyl-5-(6-butyl-2-methylphenoxymethyl)pyrazole,
3-methyl-5-(5-isopropyl-2-methylphenoxymethyl)pyrazole,
3-methyl-5-(3-methoxyphenoxymethyl)pyrazole,
3-methyl-5-(4-methoxyphenoxymethyl)pyrazole,
3-methyl-5-(2,4-dimethoxyphenoxymethyl)pyrazole,
3-methyl-5-(2,5-dimethoxyphenoxymethyl)pyrazole,
3-methyl-5-(2-ethoxyphenoxymethyl)pyrazole,
3-methyl-5-(3-ethoxyphenoxymethyl)pyrazole,
3-methyl-5-(4-ethoxyphenoxymethyl)pyrazole,
3-methyl-5-(2-propoxyphenoxymethyl)pyrazole,
3-methyl-5-(4-propoxyphenoxymethyl)pyrazole,
3-methyl-5-(2-butoxyphenoxymethyl)pyrazole,
3-methyl-5-(4-butoxyphenoxymethyl)pyrazole,
3-methyl-5-(3,4,5-trimethoxyphenoxymethyl)pyrazole,
3-methyl-5-(3-chlorophenoxymethyl)pyrazole,
3-methyl-5-(4-chlorophenoxymethyl)pyrazole,
3-methyl-5-(2,4-dichlorophenoxymethyl)pyrazole,
3-methyl-5-(2,5-dichlorophenoxymethyl)pyrazole,
3-methyl-5-(2,6-dichlorophenoxymethyl)pyrazole,
3-methyl-5-(3,4-dichlorophenoxymethyl)pyrazole,
3-methyl-5-(2,4,5-trichlorophenoxymethyl)pyrazole,
3-methyl-5-(2,4,6-trichlorophenoxymethyl)pyrazole,
3-methyl-5-(2-bromo-3-chlorophenoxymethyl)pyrazole,
3-methyl-5-(4-bromo-2-chlorophenoxymethyl)pyrazole,
3-methyl-5-(5-bromo-2,4-dichlorophenoxymethyl)pyrazole,
3-methyl-5-(4-bromo-2-fluorophenoxymethyl)pyrazole,
3-methyl-5-(2-bromophenoxymethyl)pyrazole,
3-methyl-5-(3-bromophenoxymethyl)pyrazole,
3-methyl-5-(4-bromophenoxymethyl)pyrazole,
3-methyl-5-(2,4-dibromophenoxymethyl)pyrazole,
3-methyl-5-(2,6-dibromophenoxymethyl)pyrazole,
3-methyl-5-(3,5-dibromophenoxymethyl)pyrazole,
3-methyl-5-(2-fluorophenoxymethyl)pyrazole,
3-methyl-5-(3-fluorophenoxymethyl)pyrazole,
3-methyl-5-(4-fluorophenoxymethyl)pyrazole,
3-methyl-5-(2,4-difluorophenoxymethyl)pyrazole,
3-methyl-5-(2,5-difluorophenoxymethyl)pyrazole,
3-methyl-5-(2-fluoro-4-iodophenoxymethyl)pyrazole,
3-methyl-5-(2-iodophenoxymethyl)pyrazole,
3-methyl-5-(3-iodophenoxymethyl)pyrazole,
3-methyl-5-(4-iodophenoxymethyl)pyrazole,
3-methyl-5-(2,4,5-trifluorophenoxymethyl)pyrazole,
3-methyl-5-(2,4-dichloro-6-fluorophenoxymethyl)pyrazole,
3-methyl-5-(2-bromo-4-butoxyphenoxymethyl)pyrazole,
3-methyl-5-(2-bromo-4-butylphenoxymethyl)pyrazole,
3-methyl-5-(2-bromo-4-tert.butylphenoxymethyl)pyrazole,
3-methyl-5-(2-bromo-4-ethylphenoxymethyl)pyrazole,
3-methyl-5-(4-bromo-2-methoxyphenoxymethyl)pyrazole,
3-methyl-5-(2,6-dimethoxy-4-methylphenoxymethyl)pyrazole,
3-methyl-5-(2-fluoro-3-methylphenoxymethyl)pyrazole,
3-methyl-5-(4-fluoro-2-isopropyl-5-methylphenoxymethyl)pyrazole,
3-methyl-5-(3,5-dichloro-2-methoxyphenoxymethyl)pyrazole,
3-methyl-5-(2-bromo-4-propoxyphenoxymethyl)pyrazole,
3-methyl-5-(2-sec.butyl-4-chlorophenoxymethyl)pyrazole,
3-methyl-5-(4-butyl-2-chlorophenoxymethyl)pyrazole,
3-methyl-5-(2-butyl-4-fluorophenoxymethyl)pyrazole,
3-methyl-5-(2-chloro-4-methoxyphenoxymethyl)pyrazole, and
3-methyl-5-(4-chloro-2-methoxyphenoxymethyl)pyrazole, respectively.

I claim:
1. A compound of the formula:

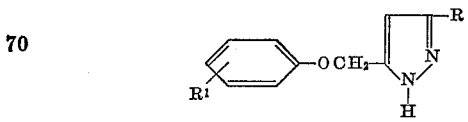

wherein R represents alkyl of one to four carbon atoms, inclusive, and $R^1$ represents from zero to three substituents selected from the group consisting of alkyl of one to four carbon atoms, inclusive, alkoxy of one to four carbon atoms, inclusive, and halogen.

2. 3-methyl-5-phenoxymethylpyrazole.

References Cited
UNITED STATES PATENTS

| | | | |
|---|---|---|---|
| 2,721,143 | 10/1955 | Kraft et al. | 260—310 |
| 2,827,415 | 3/1958 | Freeman et al. | 260—310 |
| 2,833,779 | 5/1958 | Fields et al. | 260—310 |
| 2,973,367 | 2/1961 | Easton | 260—310 |

OTHER REFERENCES

Jacobs in: Elderfield Heterocyclic Compounds, vol. 5, pp. 47–51, N.Y., Wiley, 1957.

Von Walther: Chemical Abstracts, vol. 5, p. 2077 (1911).

Wright et al.: Jour. Med. Chem., vol. 7, pp. 102–5 (January 1964).

WALTER A. MODANCE, *Primary Examiner.*

JOHN D. RANDOLPH, *Examiner.*

NATALIE TROUSOF, *Assistant Examiner.*